(12) United States Patent
Zischke et al.

(10) Patent No.: US 7,677,631 B1
(45) Date of Patent: Mar. 16, 2010

(54) VEHICLE ACCESS ASSEMBLY

(75) Inventors: Jonathan B. Zischke, Farmington Hills, MI (US); Mark D. Snyder, Farmington Hills, MI (US); John Latimer, III, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/270,951

(22) Filed: Nov. 14, 2008

(51) Int. Cl.
*B60K 15/05* (2006.01)

(52) U.S. Cl. ............... 296/97.22; 220/86.2; 439/34; 180/69.24

(58) Field of Classification Search ............ 296/97.22; 220/86.2, DIG. 33; 280/834; 439/34; 180/69.24
See application file for complete search history.

(56) References Cited

U.S. PATENT DOCUMENTS

| | | | | |
|---|---|---|---|---|
| 3,583,513 A | * | 6/1971 | Macadam et al. | 180/69.24 |
| 4,861,096 A | * | 8/1989 | Hastings | 296/183.1 |
| 5,066,062 A | * | 11/1991 | Sekulovski | 296/97.22 |
| 5,816,643 A | * | 10/1998 | Itou et al. | 296/97.22 |
| 6,092,818 A | * | 7/2000 | Shute | 180/69.21 |
| 6,976,513 B2 | | 12/2005 | Schlachter | |
| 7,546,663 B2 | * | 6/2009 | Duffy | 16/306 |

FOREIGN PATENT DOCUMENTS

JP 2000-142129 A 5/2000

* cited by examiner

*Primary Examiner*—Joseph D Pape
(74) *Attorney, Agent, or Firm*—Young Basile

(57) ABSTRACT

An access assembly for a vehicle body. The access assembly includes a body panel movably mounted to the vehicle body for movement between an open position and a closed position and defining an access opening. A door assembly is provided on the body panel and has a cover that is movable between an open position and a closed position. A vehicle component is disposed in a substantially fixed position with respect to the vehicle body, the vehicle component having a receptacle that is substantially aligned with the access opening when the body panel is in the closed position. The access opening is exposed when the cover is in the open position, and the access opening is concealed when the cover is in the closed position.

20 Claims, 6 Drawing Sheets

VEHICLE ACCESS ASSEMBLY

FIELD OF THE INVENTION

The invention relates to vehicle access assemblies, and in particular to a vehicle access assembly that is mounted at least in part to a movable body panel of the vehicle.

BACKGROUND

Certain vehicle systems include a vehicle component that is mounted in the engine compartment of the vehicle, but to which frequent access is required. Vehicles having internal combustion engines that utilize alcohol-based biofuels, such as ethanol or ethanol-gasoline blends as their primary fuel are well known. However, in vehicles that utilize some alcohol-based biofuels such as pure ethanol or high ethanol content blends as their primary fuel, it is difficult to induce combustion of the primary fuel when starting the engine from a cold-start condition. Thus, it is known to supply gasoline to the engine when starting the engine during a cold-start condition.

To supply gasoline to the internal combustion engine of an ethanol burning vehicle during engine startup, ethanol-burning vehicles often include a supplemental fluid storage tank for storing gasoline. The supplemental fluid storage tank is located in the engine compartment of the vehicle, and is mounted either to an internal wall of the engine compartment or to a portion of the engine itself. The supplemental fluid storage tank is generally small in volume, since it supplies gasoline to the engine only when the engine is starting.

As another example, diesel internal combustion engines can be provided with emission control systems that utilize urea as a reactant to reduce the amount of nitrogen oxides in the exhaust gases of the diesel engine. In such systems, it is common to mount a fluid storage tank for storing urea in the engine compartment of the vehicle.

Filling the supplemental fluid storage tank of an ethanol burning vehicle typically involves opening the hood of the vehicle, since a dedicated access to the fluid filler tubes of the supplemental fluid storage tank is generally not provided. While fluid filler tubes for engine compartment mounted fluid storage tanks have previously been provided in the cowling below the windshield of the vehicle, doing so limits the acceptable mounting locations for the supplemental fluid storage tank, and may not be feasible in light of pre-existing design constraints. It is also known to provide a fluid filler tube that extends through an aperture in the hood. However, to prevent interference between the fluid filler tube and the hood when the hood is moved between open and closed positions, the aperture must be oversized, and the hood and the fluid filler tube must be installed to close tolerances.

As a further example, electric vehicles or plug-in hybrid electric vehicles may include an electrical charging receptacle that is provided within the engine compartment of the vehicle. Providing such a receptacle so that it extends through the hood would be impractical, for the reasons stated in connection with fluid filler tubes, and further for the reason that the electric receptacle needs to be protected from the elements.

SUMMARY

Access assemblies for vehicles are taught herein. According to one embodiment, an access assembly for a vehicle body includes a body panel movably mounted to the vehicle body for movement between an open position and a closed position and defining an access opening. A door assembly is provided on the body panel and has a cover that is movable between an open position and a closed position. A vehicle component is disposed in a substantially fixed position with respect to the vehicle body. The vehicle component has receptacle that is substantially aligned with the access opening when the body panel is in the closed position. The access opening is exposed when the cover is in the open position, and the access opening is concealed when the cover is in the closed position.

Embodiments of the invention can be provided where the door assembly engages the vehicle component when the body panel is in the closed position. Furthermore, the vehicle component can include a sealing member that engages the door assembly when the body panel is in the closed position.

According to an embodiment of the invention the vehicle component is a fluid storage assembly and the receptacle is a filler opening. A splash guard can be disposed around the filler opening of the fluid storage assembly. The splash guard can include a sealing member that engages the door assembly when the body panel is in the closed position. The sealing member and the splash guard can be formed integrally. Additionally, the door assembly can include a lip that nests with respect to the splash guard when the body panel is in the closed position.

According to a further embodiment, the fluid storage assembly can be a fuel tank assembly. In an alternative embodiment, the fluid storage assembly can be a urea tank assembly.

In certain embodiments, the cover can be pivotally mounted to the body panel for movement between the open position and the closed position. As an alternative, the cover can be slidingly mounted to the body panel for movement between the open position and the closed position. As a further alternative, the cover can be threadedly mounted to the body panel, where the cover is disengaged from the body panel in the open position.

In additional embodiments, the access assembly includes a locking member that is engageable with the cover to restrain movement of the cover from the closed position to the open position.

In some embodiments, the body panel is a hood of the vehicle body.

In other embodiments, the body panel is pivotally mounted to the vehicle body for movement between the open position and the closed position.

In another embodiment, the receptacle is an electrical contact.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
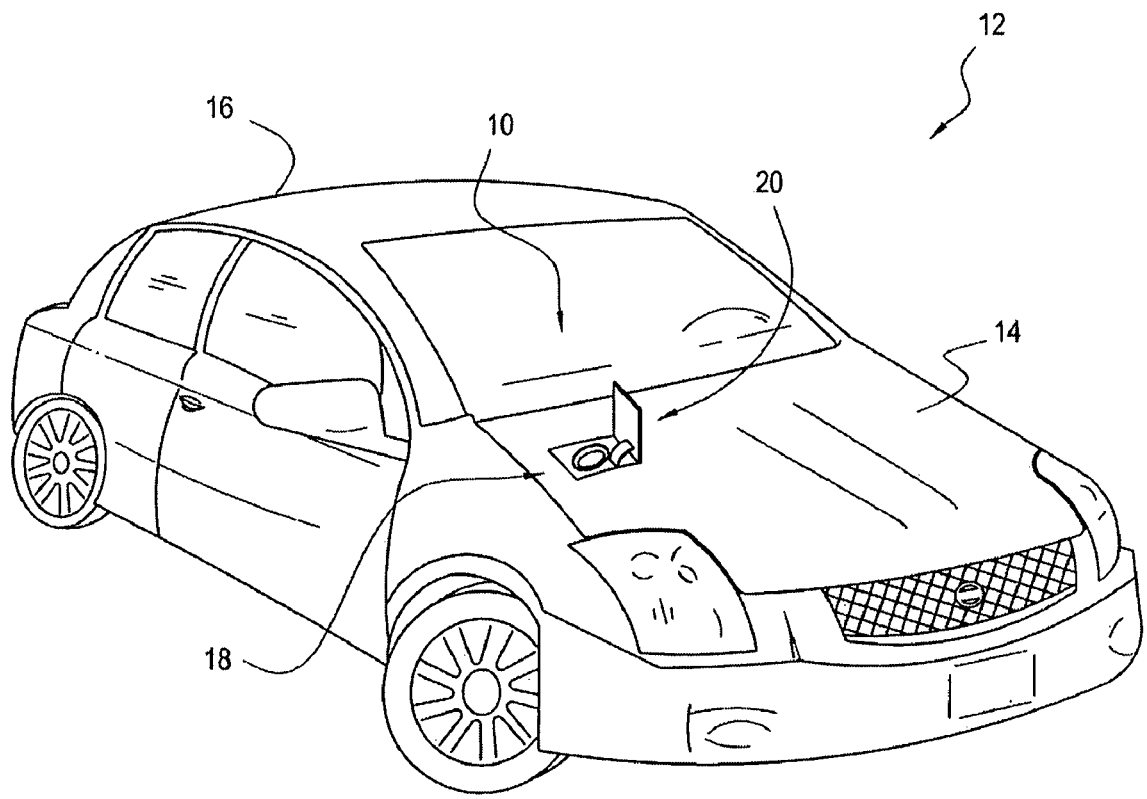
FIG. 1 is a perspective view showing an automobile having an access assembly in accordance with a first embodiment.

FIG. 1 shows an access assembly 10 for a vehicle 12 according to the invention. The access assembly 10 is mounted at least in part to a body panel, such as a hood 14 that is pivotally mounted to a vehicle body 16 of the vehicle 12 for movement between an open position and a closed position. When the hood 14 of the vehicle 12 is in the open position, access is provided to an engine compartment (not shown) of the vehicle 12. The access assembly 10 includes a vehicle component, such as a fluid storage tank assembly 18 that is disposed within the engine compartment of the vehicle 12. The access assembly 10 also includes a door assembly 20 that provides access to the fluid storage tank assembly 18 when the hood 14 of the vehicle 12 is in the closed position. By way of example, fluid, storage tank assembly 18 could be a supplemental fuel tank assembly for an ethanol-burning engine, or the fluid storage assembly could be a urea tank assembly for the emissions-control system of a diesel engine.

Figure 2:
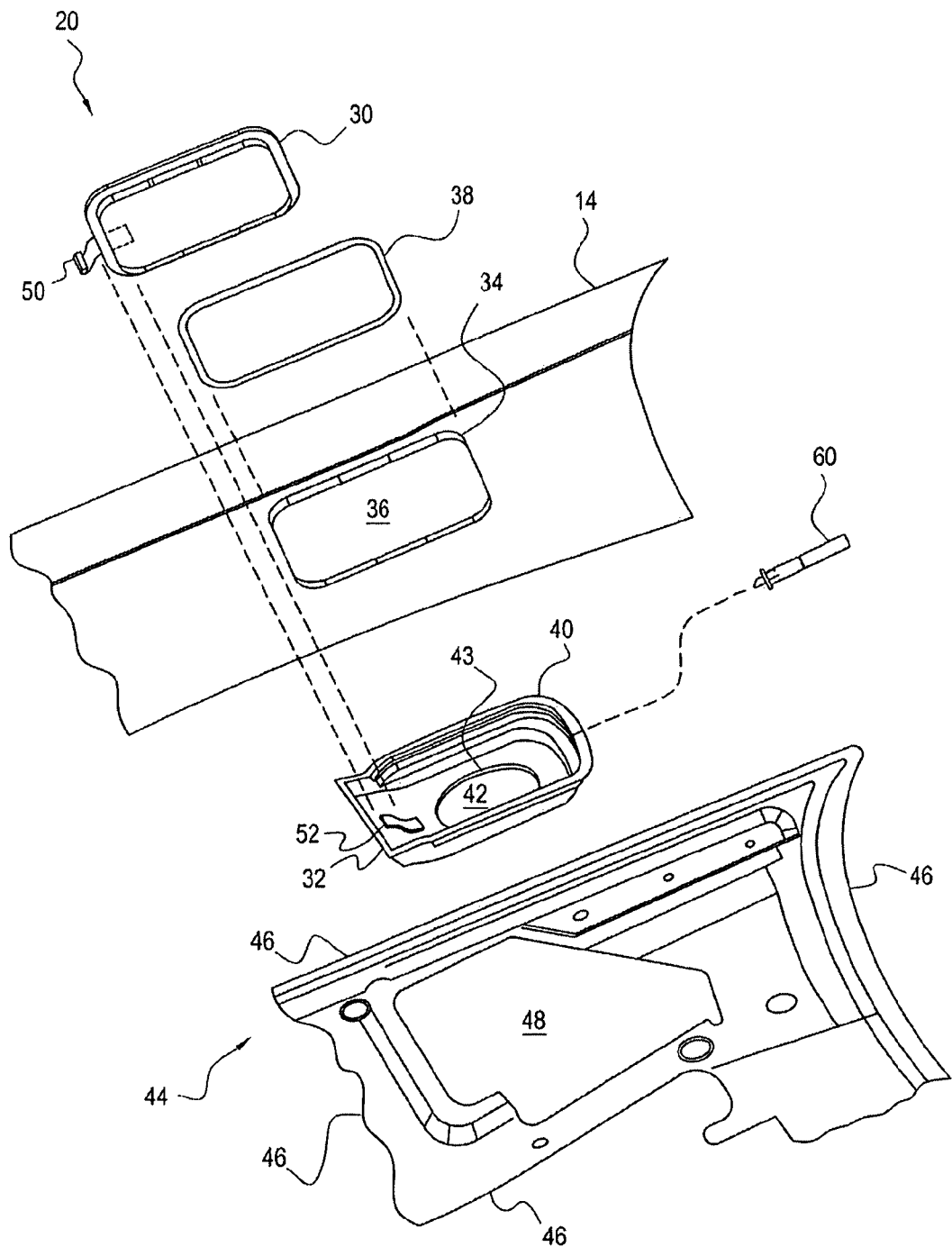
FIG. 2 is an exploded perspective view of a door assembly of the access assembly of FIG. 1.
Figure 3:
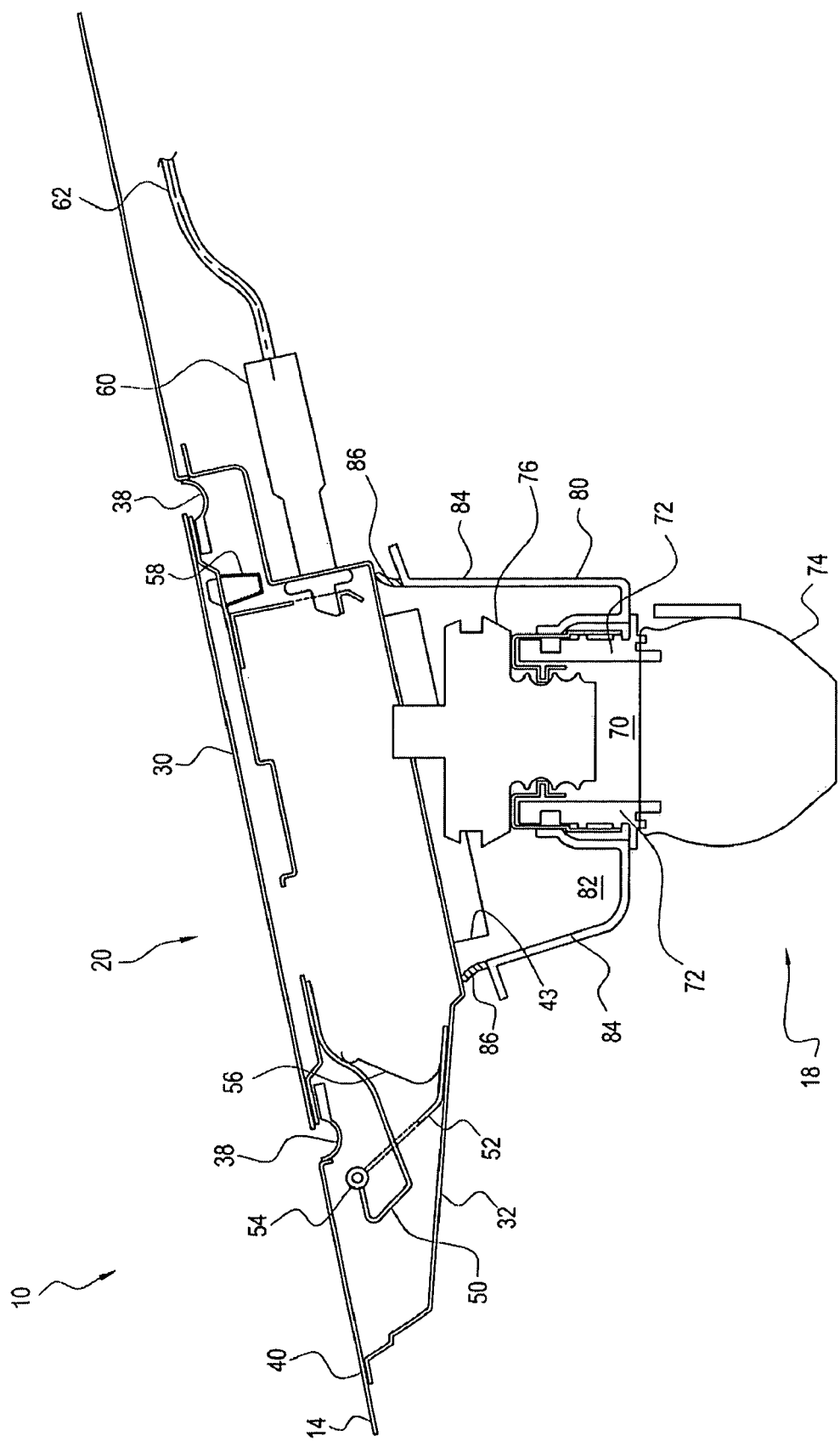
FIG. 3 is a sectional view showing the access assembly of FIG. 1.

As shown in FIGS. 2-3, the door assembly 20 includes a lid or cover 30, a mounting base 32 that connects the cover 30 to the hood 14 of the vehicle 12, and an access opening 36 that is provided through the hood 14. The cover 30 is a substantially planar member that is configured and arranged to be received in the access opening 36 of the hood 14. The cover 30 is movable between an open position and a closed position with respect to the hood 14. When the cover 30 is in the open position, the access opening 36 of the hood 14 is exposed and thus usable to access the area under the hood 14 adjacent to the access opening 36. When the cover 30 is in the closed position, the cover 30 substantially occupies and thus conceals the access opening 36. Furthermore, a sealing member 38 may be provided around a periphery 34 of the access opening 36 to seal the cover 30 with respect to the hood 14 when the cover 30 is in the closed position, thereby reducing wind noise, improving the appearance of the door assembly 20, and preventing intrusion by debris, water, and other elements into the area under the cover.

The mounting base 32 is a substantially tray-like member. The mounting base 32 includes an upward-facing rim 40 around its outer periphery to allow the mounting base 32 to be connected to the underside of the hood 14 by conventional methods, such as welding. A base opening 42 is provided through the mounting base 32 such that the base opening 42 and the access opening 36 are substantially aligned. The mounting base 32 can include a downwardly-extending lip 43 that extends substantially downward from the periphery of the base opening 42 to substantially surround the base opening 42.

The access opening 36 is positioned on the hood 14 so that a driver of the vehicle 12 can conveniently perform a filling operation. However, it is noted that a frame 44 is connected to the underside of the hood 14 to provide rigidity to the hood 14. The frame 44 is a truss-like member that includes beam portions 46 and frame openings 48 that are defined between the beam portions 46. Accordingly, the access opening 36 is positioned on the hood 14 such that the mounting base 32 of the door assembly 20 is positioned substantially within the frame opening 48 of the frame 44. However, it is noted that portions of the mounting base 32 can be disposed between the frame 44 and the hood 14. In particular, the rim 40 of the mounting base 32 can be at least partially captured between the frame 44 and the hood 14.

The cover 30 can be pivotally mounted to the mounting base 32 for movement between the open position and the closed position. In particular, a first bracket portion 50 can be connected to the cover 30, and a second bracket portion 52 can be connected to the mounting base 32, where the first bracket portion 50 is connected to the second bracket portion 52 by a pivot joint 54.

A biasing element 56 can be provided to bias the cover 30 toward the open position. For example, the biasing element 56 could be connected to the second bracket portion 52 to exert a biasing force against the first bracket portion 50. A bumper 58 can be provided on either the cover 30 or the mounting base 32 to restrain the cover 30 from moving inwardly toward the base portion 32 past the closed position by engagement of the bumper 58 with either the mounting base 32 or the cover 30. To retain the cover 30 in the closed position, a locking mechanism 60 can be provided on the mounting base 32 for selective engagement with the cover 30. Additionally, a remote release mechanism 62 can be provided to allow release of the locking mechanism 60 from the interior of the vehicle 12.

The fluid storage tank assembly 18 is disposed in a substantially fixed position with respect to the vehicle body 16. It should be understood, however, that the fluid storage tank assembly 18 can be connected to the vehicle 12 in a manner that allows for some degree of motion between the fluid storage tank assembly 18 and the vehicle body 16. For example, the fluid storage tank assembly 18 could be mounted to another vehicle component, such as the engine (not shown) of the vehicle 12, and the fluid storage tank assembly 18 would still be considered to be mounted in a substantially fixed position with respect to the vehicle body 16 as understood herein.

The fluid storage tank assembly 18 includes a filler opening 70 that is defined by a neck 72. The neck 72 is connected to a fluid storage tank 74 of the fluid storage tank assembly 18, so that fluid, such as fuel, urea, or other fluids, may be provided to the fluid storage tank 74 through the filler opening 70. When the hood 14 is in the closed position, the filler opening 70 is substantially aligned with the base opening 42 of the mounting base 32, as well as with the access opening 36. The neck 72 of the fluid storage tank assembly 18 can be either internally or externally threaded for threaded engagement with a cap 76 that selectively closes the filler opening 70 to prevent fluid and vapors from escaping from the fluid storage tank 74.

The fluid storage tank assembly 18 can include a cowling or splash guard 80 to prevent spilled fluid from entering the engine compartment during the filling operation. The splash guard 80 can have a substantially U-shaped cross-section that circumscribes the neck 72 to provide a trough 82 around the periphery of the neck 72. The trough 82 of the splash guard 80 can be bounded at its exterior by an upstanding wall 84, wherein the wall 84 is disposed outward of the lip 43 that extends downward from the periphery of the base opening 42 of the mounting base 32 of the door assembly 20. In this manner, the lip 43 of the mounting base 32 nests within the splash guard 80 when the hood 14 is in the closed position.

The splash guard 80 can include a sealing member 86 that engages the mounting base 32 of the door assembly 20 when the hood 14 is in the closed position. The sealing member 86 can be provided on the upper end of the upstanding walls 84 of the splash guard 80 for resilient engagement with the base portion 32. The sealing member 86 can be formed integrally with the splash guard 80, for example, by providing the sealing member 86 as an extension of the upstanding walls 84 that has a reduced thickness with respect to the upstanding walls 84.

Although shown and described herein as a portion of the tank assembly 18, it should be understood that the splash guard 80 could be provided separate from the tank assembly 18. For example, the splash guard 80 could be mounted to the mounting base 32 for movement therewith, and the sealing member 86 could be configured and arranged to engage the fluid storage tank assembly 18 when the hood 14 is in the closed position.

Figure 4:
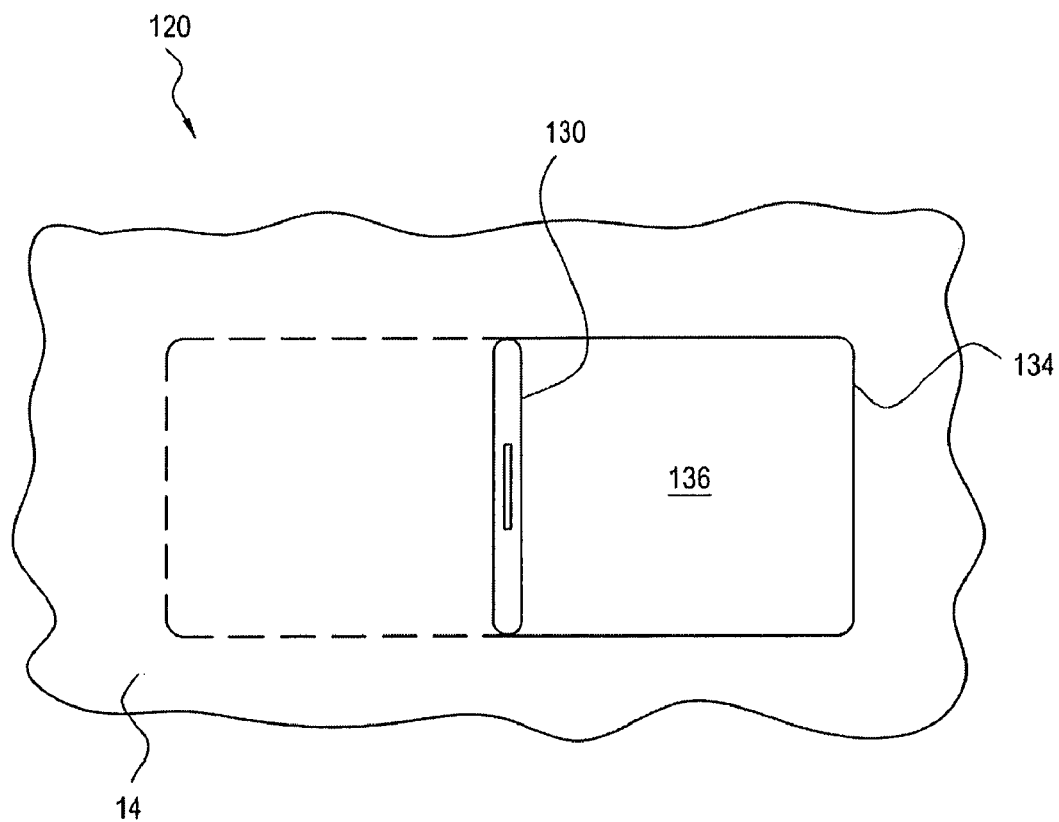
FIG. 4 is a top view showing a sliding door assembly of an access assembly in accordance with a second embodiment.

As shown in FIG. 4, an alternative embodiment of the access assembly 10 includes a sliding door assembly 120. The sliding door assembly 120 includes a cover 130 that is slidingly mounted to the hood 14 of the vehicle 12 for movement between an open position and a closed position with respect to an access opening 136 that is formed through the hood 14 of the vehicle 12. The cover 130 is complementary in size and shape to a periphery 134 of the access opening 136. When the cover 130 is in the open position, the access opening 136 is exposed. When the cover 130 is slid from the open position to the closed position, the cover 130 substantially occupies and thus conceals the access opening 136. The remainder of the access assembly 10 is as described in connection with the embodiment shown in FIGS. 1-3.

Figure 5:
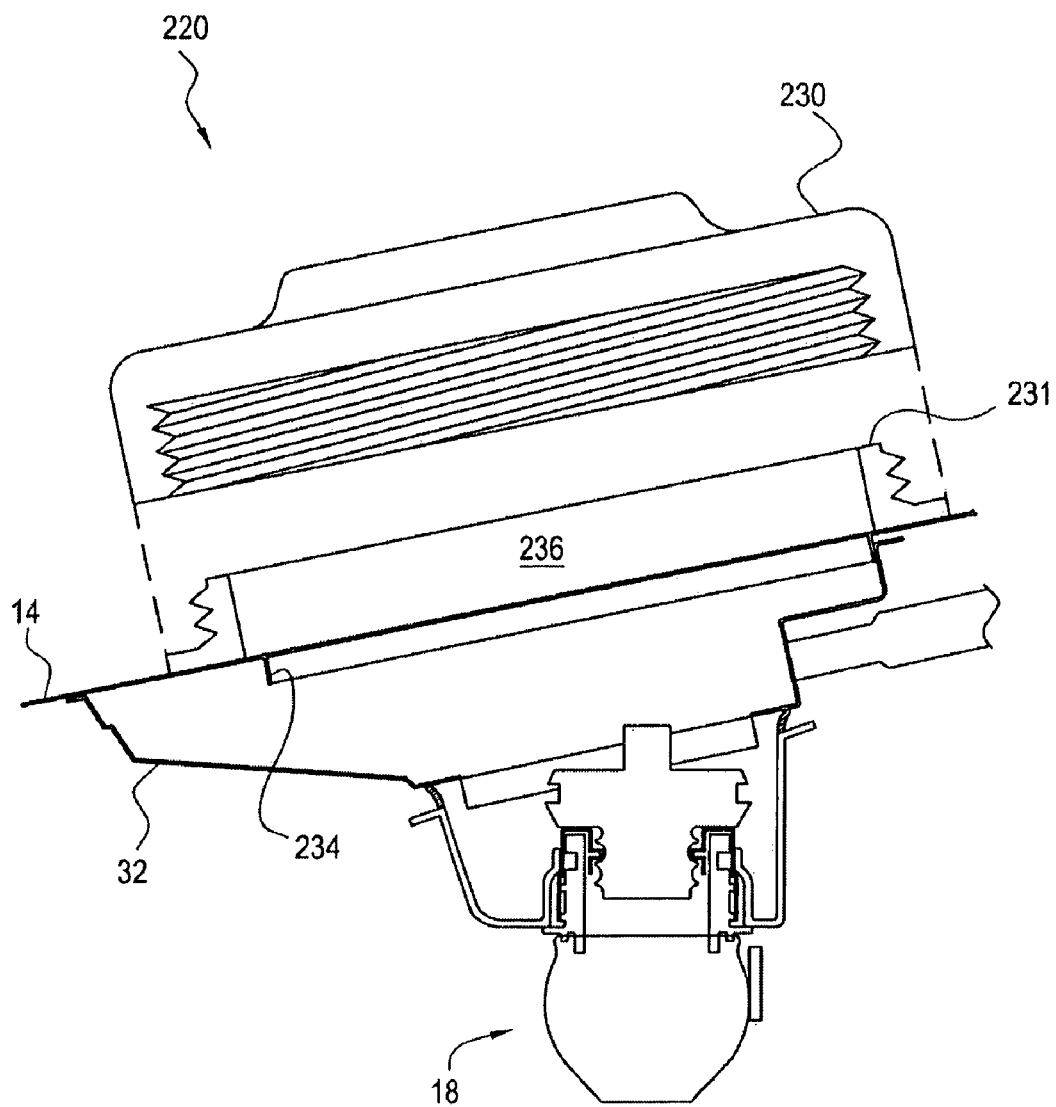
FIG. 5 is a sectional view showing a screw-on door assembly of an access assembly in accordance with a third embodiment.

FIG. 5 shows a threaded door assembly 220. The threaded door assembly 220 includes a cover 230 and a threaded base 231. The threaded base 231 is connected to an exterior surface of the hood 14 and includes in inner periphery 234 that circumscribes an access opening 236 that is defined through the hood 14. The cover 230 and the threaded base 231 have complementary threads formed thereon for threaded engagement of the cover 230 with the threaded base 231. In particular, the cover 230 moves between an open position and a closed position with respect to the hood 14 by threaded disengagement and engagement of the cover 230 with the threaded base 231. When the cover 230 is in the open position, the access opening 236 is exposed. When the cover 230 is in the closed position, the access opening 236 is concealed. The remainder of the access assembly 10 is as described in connection with the embodiment shown in FIGS. 1-3.

Figure 6:
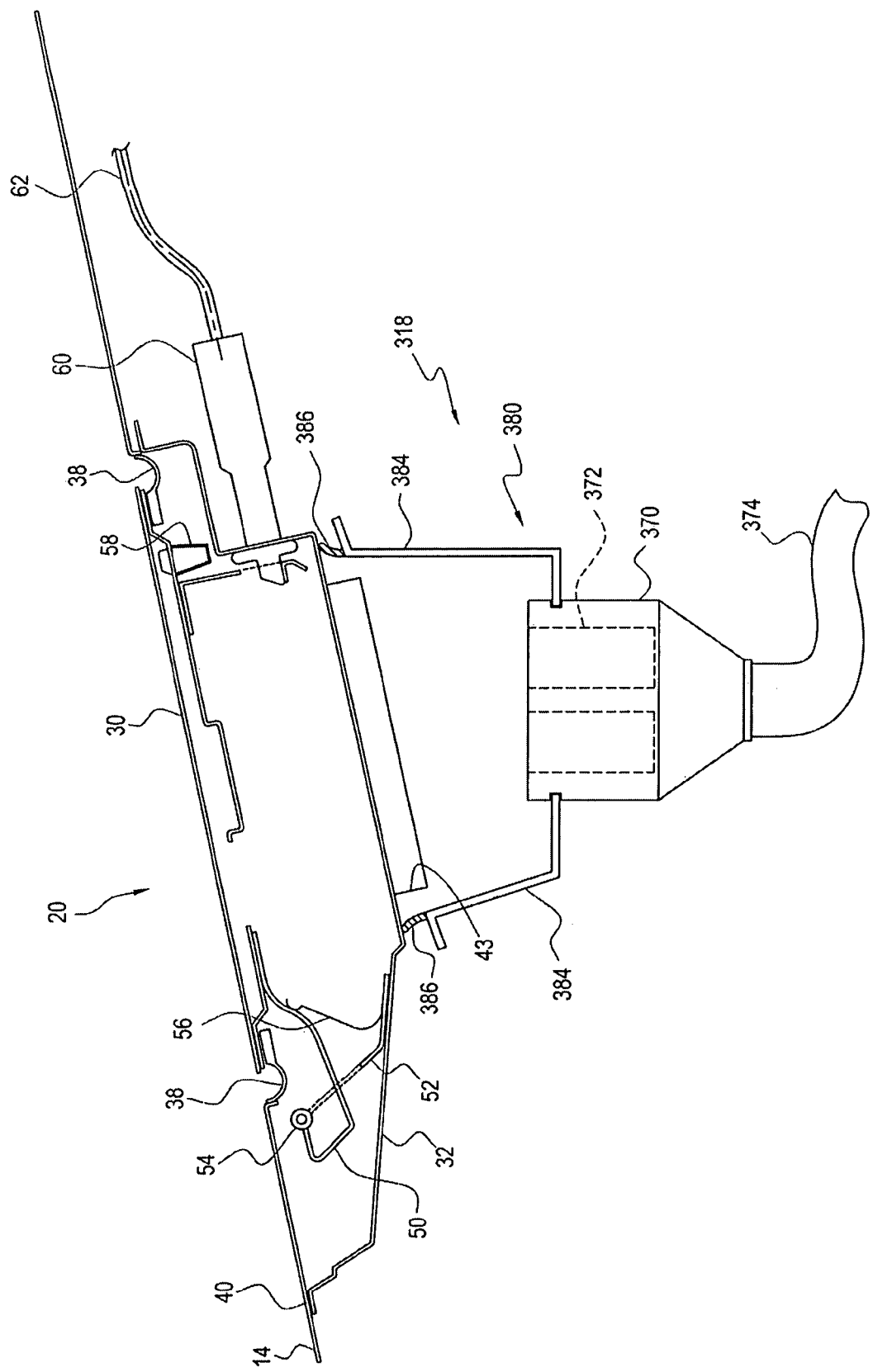
FIG. 6 is a sectional view showing an alternative vehicle access assembly according to a fourth embodiment.

Although the foregoing embodiments describe the access assembly 10 in connection with a fluid storage tank assembly 18, it should be understood that the invention is not limited to use with a fluid storage tank assembly 18. Rather, the access assembly 10 can be used to provide access to various types of vehicle components. For example, an alternative embodiment of the access assembly 10 includes an electrical connection assembly 318, as shown in FIG. 6. Except as described herein, the remainder of the access assembly 10 is as described in connection with the embodiment of FIGS. 1-3. The electrical connection assembly 318 may be a portion of an electrical charging system for an electric vehicle or a plug-in hybrid electric vehicle. The electrical connection assembly 318 includes a connection block 370 having at least one electrical contact 372 defined therein, wherein the electrical contact 372 is in electrical communication with a vehicle electrical system (not shown) by way of an electrical cable 374. The electrical connection assembly 18 can include a cowling 380 that engages and circumscribes the connection block 370. The cowling 380 can be bounded at its exterior by an upstanding wall 384 that is disposed outward of the lip 43 that extends downward from the periphery of the base opening 42 of the mounting base 32 of the door assembly 20. Accordingly, the lip 43 of the mounting base 32 nests within the cowling 380 when the hood 14 is in the closed, position. Furthermore, the cowling 380 can include a sealing member 386 that is provided on the upper end of the upstanding walls 384 and engages the mounting base 32 of the door assembly 20 when the hood 14 is in the closed position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An access assembly for a vehicle body, the access assembly comprising:
    a body panel movably mounted to the vehicle body for movement between an open position and a closed position and defining an access opening;
    a door assembly provided on the body panel and having a cover that is movable between an open position and a closed position; and
    a vehicle component disposed in a substantially fixed position with respect to the vehicle body, the vehicle component having a receptacle that is substantially aligned with the access opening when the body panel is in the closed position,
    wherein the access opening is exposed when the cover is in the open position, and the access opening is concealed when the cover is in the closed position, and the door assembly engages the vehicle component when the body panel is in the closed position.

2. The access assembly of claim 1, wherein the vehicle component further comprises:
    a sealing member that engages the door assembly when the body panel is in the closed position.

3. The access assembly of claim 1, wherein the vehicle component is a fluid storage assembly and the receptacle is a filler opening.

4. The access assembly of claim 3, wherein the fluid storage assembly further comprises:
    a cowling disposed around the filler opening of the fluid storage assembly.

5. The access assembly of claim 4, wherein the cowling further comprises:
    a sealing member that engages the door assembly when the body panel is in the closed position.

6. The access assembly of claim 5, wherein the sealing member and the cowling are formed integrally.

7. An access assembly for a vehicle body, the access assembly comprising:
    a body panel movably mounted to the vehicle body for movement between an open position and a closed position and defining an access opening;
    a door assembly provided on the body panel having a cover that is movable between an open position and a closed position, wherein the access opening is exposed when the cover is in the open position, and the access opening is concealed when the cover is in the closed position;
    a vehicle component disposed in a substantially fixed position with respect to the vehicle body, the vehicle component having a receptacle that is substantially aligned with the access opening when the body panel is in the closed position and a cowling that is disposed around the receptacle of the vehicle component; and
    the door assembly having a lip that nests with respect to the cowling when the body panel is in the closed position.

8. The access assembly of claim 3, wherein the fluid storage assembly is a fuel tank assembly.

9. The access assembly of claim 3, wherein the fluid storage assembly is a urea tank assembly.

10. The access assembly of claim 1, wherein the cover is pivotally mounted to the body panel for movement between the open position and the closed position.

11. The access assembly of claim 1, wherein the cover is slidingly mounted to the body panel for movement between the open position and the closed position.

12. The access assembly of claim 1, wherein the cover is threadedly mounted to the body panel, where the cover is disengaged from the body panel in the open position.

13. The access assembly of claim 1, wherein the door assembly further comprises:
 a locking member that is engageable with the cover to restrain movement of the cover from the closed position to the open position.

14. The access assembly of claim 1, wherein the body panel is a hood of the vehicle body.

15. The access assembly of claim 1, wherein the body panel is pivotally mounted to the vehicle body for movement between the open position and the closed position.

16. The access assembly of claim 1, wherein the receptacle is an electrical contact.

17. The access assembly of claim 1, further comprising:
 the door assembly including a mounting base that defines a base opening, wherein the base opening is aligned with the receptacle when the body panel is in the closed position.

18. The access assembly of claim 17, wherein the mounting base contacts the vehicle component when the body panel is in the closed position.

19. The access assembly of claim 1, further comprising:
 the door assembly having a surface that is in contact with the vehicle component when the body panel is in the closed position.

20. An access assembly for a vehicle body, the access assembly comprising:
 a body panel movably mounted to the vehicle body for movement between an open position and a closed position and defining an access opening;
 a door assembly provided on the body panel and having a cover that is movable between an open position and a closed position, wherein the access opening is exposed when the cover is in the open position, and the access opening is concealed when the cover is in the closed position;
 a vehicle component disposed in a substantially fixed position with respect to the vehicle body, the vehicle component having a receptacle that is substantially aligned with the access opening when the body panel is in the closed position; and
 the vehicle component having a cowling that is disposed around the receptacle, wherein at least a portion of the cowling is spaced apart from the receptacle.

* * * * *